May 26, 1970  J. T. LINGLE  3,514,692
HIGH EFFICIENCY VOLTAGE REGULATING CIRCUIT
Filed June 22, 1967
FIG. 1
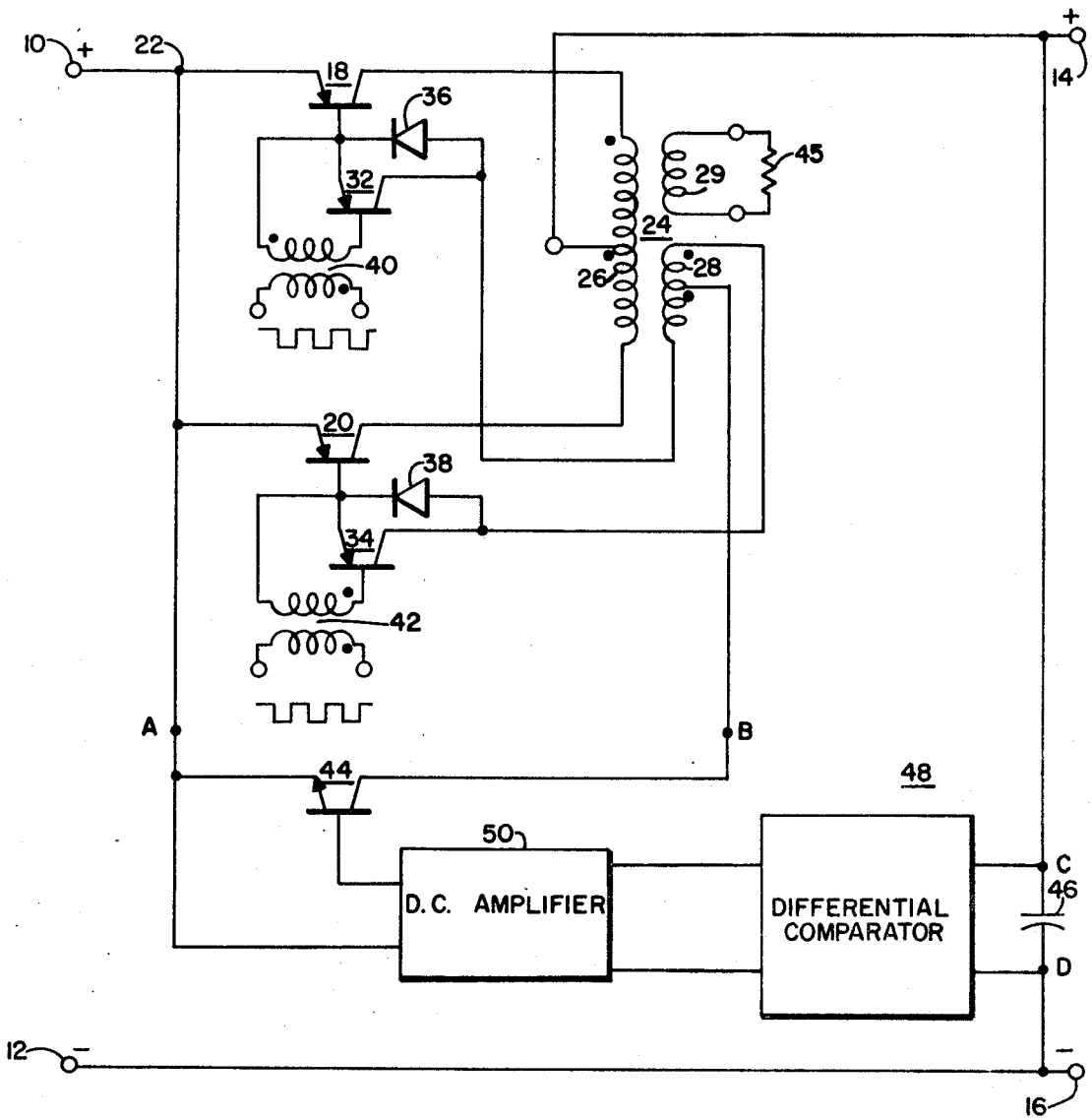
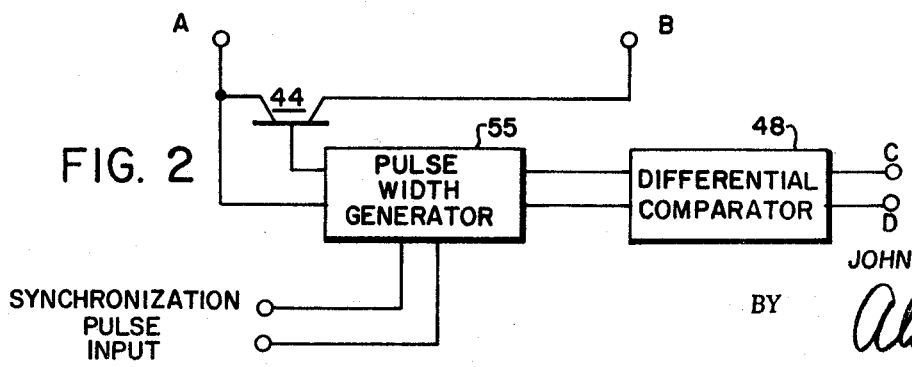
FIG. 2
SYNCHRONIZATION PULSE INPUT
INVENTOR.
JOHN T. LINGLE
BY
ATTORNEY United States Patent Office 3,514,692
Patented May 26, 1970

3,514,692
HIGH EFFICIENCY VOLTAGE REGULATING CIRCUIT
John T. Lingle, Bloomington, Minn., assignor to Honeywell Inc., Minneapolis, Minn., a corporation of Delaware
Filed June 22, 1967, Ser. No. 648,067
Int. Cl. G05f 1/58
U.S. Cl. 323—22
7 Claims

ABSTRACT OF THE DISCLOSURE

A DC voltage regulating circuit comprising two parallel transistors and means for switching the two transistors in such a way that only one of them is conducting at any particular time, thus increasing the current carrying capacity of the circuit. The output voltage is compared to a reference voltage to generate an error signal indicative of the deviation from a predetermined level. This error signal is used to control the conductivity of the two series transistors. The current to the load is directed through an output transformer which has windings connected in controlling relationship to the series transistors, and further has an additional winding connected to an impedance for serving as a sink into which any excess amount of feedback current is shunted.

BACKGROUND OF THE INVENTION

Series type regulating circuits can be found in prior art wherein a controllable impedance element is connected in a series path between the source of potential and the load. To maintain a constant voltage across the load, means are provided for comparing the output voltage from the regulator circuit with a predetermined reference potential. The error signal thus generated is used to regulate the controllable impedance element in a way to minimize the deviation of the output voltage from the predetermined value. An example of such a circuit can be found in U.S. Pat. No. 2,992,385 issued to the present inventor on July 11, 1961. That patent shows how the load current can be divided between two or more transistors to increase the power handling capabilities of the voltage regulator circuit. This is accomplished, not by distributing current through two or more transistors simultaneously, but by allowing each transistor to conduct only a part of the time. If two transistors are used, for example, each transistor is conducting only one half of the time; if three transistors are used, each transistor is conducting only one third of the time. This results in a lower power dissipation in each transistor, enabling the circuit to handle greater total power.

The circuit of the above-referenced patent provides for substantially constant bias to the series regulating element which is independent of the load current. To optimize the efficiency of the circuit, the present invention provides the series regulating element with a variable bias which is proportional to the load current flowing through the series element.

SUMMARY OF THE INVENTION

Briefly, the invention provides for a DC voltage regulator, whose function it is to maintain the voltage across a load substantially constant. The circuit comprises series element which in the preferred embodiment consists of two parallel transistors. Means are provided for switching the two transistors in such a way that only one transistor is conducting at a particular instant of time and each transistor is conducting one half of the total time.

Means are provided for comparing the output voltage to a reference voltage and to generate an error signal indicative of the deviation of the output voltage from a predetermined level. This error signal is amplified and applied to the base electrode of the two switching transistors in the series element to vary the impedance of the series element as a function of output voltage. Also provided is a current transformer whose primary winding is connected in series with the load current path. The function of this transformer is to provide a drive potential for the two transistors which is a function of the load current. The conductivity of the two switching transistors is controlled as a function of output current by a secondary winding of the current transformer, which is connected to the base electrodes of the two switching transistors.

BRIEF DESCRIPTION OF THE DRAWINGS

FIG. 1 illustrates the preferred embodiment of the present invention; and
FIG. 2 is an alternate embodiment incorporating the present invention.

DESCRIPTION OF THE PREFERRED EMBODIMENTS

Referring now to FIG. 1, input terminals 10 and 12 are provided for connection to an unregulated source of DC potential and output terminals 14 and 16 are provided for connection to a load. Regulating transistors 18 and 20 are provided for controlling the load current delivered from the source to the load. The emitter electrodes of transistors 18 and 20 are connected to input terminal 10 which is to be connected to the positive potential terminal of the source. The collector electrode of transistor 18 is connected to a first end of a primary winding 26 of a current transformer 24. The other end of winding 26 is connected to the collector electrode of transistor 20. Current transformer 24 further has secondary windings 28 and 29. Primary windings 26 has an intermediate tap which is connected to output terminal 14.

A pair of driving transistors 32 and 34 are provided. Transistor 32 is associated with regulating transistor 18 and transistor 34 is associated with regulating transistor 20. The emitter of transistor 32 is connected to the base of transistor 18 and the collector of transistor 32 is connected to one end terminal of secondary winding 28 of current transformer 24. A diode 36 is connected between the collector and the emitter electrodes of transistor 32, the diode being oriented for forward current flow from collector to emitter.

The other end of secondary winding 28 is connected to the collector electrode of driving transistor 34. A diode 38 is connected between the collector and the emitter electrodes of transistor 34, the diode being oriented for forward current flow from collector to emitter. The emitter of transistor 34 is further connected directly to the base electrode of transistor 20. An impedance 45 is connected directly across winding 29 on transformer 24.

A pulse transformer 40 has a primary winding for receiving a pulse or square wave input, and further has a secondary winding connected between the base and emitter electrodes of transistor 32. A pulse transformer 42 has a primary winding for receiving a pulse or square wave input signal, and has a secondary winding connected between the base and the emitter electrodes of transistor 34. Primary windings of transformers 40 and 42 may be connected to the output of a square wave oscillator not shown in the drawing. Transformers 40 and 42 are connected such that a positive pulse across the primary winding of transformer 40 will turn transistor 32 ON and a positive pulse across the primary winding of transformer 42 will turn transistor 34 OFF.

A differential comparator 48 has a first input terminal connected to output terminal 14 and a second input terminal connected to output terminal 16. The function of comparator 48 is to compare the voltage appearing between output terminals 14 and 16 to a reference voltage and to provide an error signal indicative of the variation of the output voltage from a predetermined preferred value. The error signal from comparator 48 is amplified by an amplifier 50 and applied between the emitter and the base of a transistor 44. The emitter of transistor 44 is further connected directly to input terminal 10 and the collector electrode of transistor 44 is connected to an intermediate tap on secondary winding 28 of current transformer 24. A filter capacitor 46 is connected across output terminals 14 and 16.

FIG. 2 illustrates a configuration for an alternate embodiment of the regulator circuit. By connecting the circuit of FIG. 2 at points A, B, C and D of FIG. 1, in substitution for the circuitry shown there, pulse width modulation may be used to provide amplitude regulation. Differential comparator 48 has its inputs connected to output terminals 14 and 16 respectively and has its output connected to the input of pulse width generator 55. A pulse width generator further has a second input for receiving a synchronization pulse input, which preferably would be received from the same source supplying pulses to the primary winding of transformers 40 and 42. The output of pulse width generator is applied between the base and the emitter electrode of transistor 44.

OPERATION

An unregulated source of DC voltage is applied across input terminals 10 and 12 of the regulator circuit of FIG. 1. The positive terminal of the voltage source is connected to input terminal 10. Output terminals 14 and 16 are connected across a load. The main current can be traced from input terminal 10 through alternately conducting transistors 18 and 20, through one or the other half of primary winding 26 of current transformer 24, from intermediate tap of primary winding 26 to output terminal 14, and through a load back to output terminal 16 and input terminal 12. A portion of the voltage applied across input terminals 10 and 12 is dropped across the alternately conducting transistors 18 and 20. There remains a potential which appears as a regulated DC voltage across output terminals 14 and 16. The switching of transistors 18 and 20 is accomplished by means of pulse signals impressed across the emitter-base junction of the associated driving transistors 32 and 34. The pulse signal is applied to the emitter-base junction of driving transistor 32 through pulse transformer 40 and to the emitter-base junction of driving transistor 34 through pulse transformer 42. The signals applied to the basis of transistors 30 and 34 through the primary windings of transformers 40 and 42 are of equal frequency but of opposite polarity, thereby resulting in alternate conduction of transistors 18 and 20.

The switching of the currents between transistors 18 and 20 will cause each half of the primary winding 26 on current transformer 24 to see a pulse signal. The pulse signals excite transformer 24 and induce signals in windings 26, 29, and 28. The pulse current signals through each half of primary winding 26 are summed at the intermediate tap of winding 26 and flow as pulsating DC to output terminal 14. It is likely that spikes will occur in the transition region of the summed signal. To eliminate these spikes, special filter means can be provided, such as, for example, capacitor 46 between output terminals 14 and 16. The DC signal from input terminal 10, being chopped by transistors 18 and 20 into two pulse strings, will appear to transformer 24 as a bidirectional pulsed signal, inducing a current in secondary winding 28. Secondary winding 28 provides collector current to transistors 32 and 34, thereby controlling the base current to transistors 18 and 20. In view of the operation of current transformer 24, an increase in load current will cause an increase in current available to drive the bases of transistors 18 and 20. Typically, more drive current is desired when the load is increased.

The collector current of transistors 32 and 34 is further controlled by the current through transistor 44. The current through transistor 44 is controlled by the error signal developed in the differential comparator 48. Differential comparator 48 compares the output voltage between terminals 14 and 16 to a reference voltage, and provides an output signal which is a function of the deviation of the output voltage from a predetermined level. The error signal from differential comparator 48 is amplified by amplifier 50 and applied across the base-emitter junction of transistor 44.

This amplified error signal modulates the collector to emitter impedance of transistor 44 which controls the drive current to the bases of alternately conducting transistors 18 and 20. The total secondary current in transformer 24 is directly proportional to its primary current. The total secondary current is divided into two main paths; one through winding 28 and the other through winding 29. One main current path flows through the intermediate tap of secondary winding 28, transistor 44, the emitter base junction of either alternately conducting transistors 18 or 20, and the emitter collector junction of either alternately conducting transistor 32 or 34 respectively and then back to one side of winding 28. This current path controls the voltage drop across the voltage regulator. A very minor current also flows through winding 28 and alternately through diodes 36 and 38 to back bias the alternately non-conducting transistors 18 and 20. The other main current path flows through winding 29 and through the impedance 45 connected across it. When the source voltage is low, the regulator drop is low and most of the proportional secondary current flows through the first current path to drive the power transistors 18 and 20 so that they present little impedance. On the other hand, when the input voltage is higher, the regulator must provide a greater voltage drop and this is accomplished by reducing the portion of the available current drive which flows to the regulator. This is done by increasing the impedance of transistor 44 which reduces the regulator drive current, increases the impedance in series with winding 28, increases the induced voltage across windings 28 and 29 on transformer 24, and thereby causes a larger portion of the available current drive to be shunted through winding 29 and impedance 45. Thus, impedance 45 and transistor 44 allow the differential comparator and amplifier to divide and control the percentage of available proportional current that is actually used for drive purposes. Impedance 45 can be either linear or it can diminish impedance with voltage increase in a non-linear manner. The shunting of some of the proportional drive current through impedance 45 allows the regulator to compensate for variations in input voltage and in transistor characteristics that will occur during normal operation and over environmental temperature ranges.

In the circuit of FIG. 1, as discussed above, the current through transistor 44 is amplitude modulated by the error signal developed in differential comparator 48. A pulse width modulation technique may be substituted for the amplitude modulation by modifying the circuit of FIG. 1 as shown by FIG. 2. As in the case of the circuit of FIG. 1, the output voltage between output terminals 14 and 16 is compared to a reference voltage by differential comparator 48. At the output of differential comparator 48 will appear a DC signal whose amplitude will be indicative of the deviation of the output voltage from the predetermined value. The DC error signal is applied to the input of pulse width generator 55 at whose output will appear a train of equal amplitude pulses whose width will be a function of the level of the error signal. Such pulse width generators are well known in the art. In this circuit configuration transistor 44 is operating in a switching mode. Cutting OFF the current through transistor 44 also cuts off the current through transistors 32 and 34, thereby turning transistors 18 and 20 OFF. In this mode of operation, transistors 18 and 20 may be ON for less than one half of a cycle, thereby leaving intervals of time when no current will flow through primary winding 26 of transformer 24. The signal flowing from intermediate tap of winding 26 to the output terminal will then appear as a series of equally spaced pulses whose width will be varied in accordance with the error signal generated by differential comparator 48. To provide a smooth DC output signal it will be necessary to provide a filtering means, such as capacitor 46 between output terminals 14 and 16 and perhaps an inductor in the series path from the intermediate tap of winding 26 to output terminal 14. When an inductor is used, a commutating diode is customarily placed between the intermediate tap on winding 26 and output terminal 16 such that the anode is connected to terminal 16.

I claim:
1. A regulating circuit comprising:
input means for connection to a source and output means for connection to a load;
a plurality of controllable impedance means connected in parallel with one another and being serially disposed between said input means and said output means;
a current transformer having a plurality of windings, at least one of said windings being connected in the series path with each of said controllable impedance means, and further windings connected in a controlling relationship with said controllable impedance means;
means connected to said controllable impedance means for periodically and sequentially switching said impedance means between high impedance and relatively low impedance states;
voltage feedback means connected to said output means and to said controllable impedance means for controlling the conductivity of said impedance means as a function of output voltage; and
an additional winding on said current transformer and an additional impedance connected between the ends of said additional winding, whereby the excess amount of feedback current is shunted through said additional winding and said additional impedance.
2. Apparatus according to claim 1, wherein said plurality of controllable impedance means are transistors.
3. In a regulating circuit:
a plurality of controllable impedance means connected in parallel with one another and being serially disposed between a source means and a load means;
means connected to said controllable impedance means for periodically and sequentially switching said impedance means between high impedance and relatively low impedance states;
load current sensing means connected to the output of said regulating circuit to detect the current delivered to the load and to provide a feedback current signal proportional to the load current;
voltage sensing means;
means connecting said load current sensing means to said controllable impedance means and to said voltage sensing means for providing a controllable portion of said feedback current signal to modulate the impedance of said controllable impedance means; and
means for receiving the portion of said feedback current signal not utilized by said controllable impedance means.
4. Apparatus according to claim 3, wherein said controllable impedance means are transistors.
5. Apparatus according to claim 3, wherein said current sensing means is a current transformer having a winding connected in series with said controllable impedance means and said load means, and said means connecting said load current sensing means includes additional windings on said transformer connected in a controlling relationship with said controllable impedance means.
6. Apparatus according to claim 3, wherein said means for receiving the portion of the feedback current signal not utilized by said controllable impedance means includes a separate winding on said current transformer and an impedance connected to said separate winding.
7. Apparatus according to claim 6, wherein said controllable impedance means are transistors.

References Cited

UNITED STATES PATENTS 2,992,385  7/1961  Lingle.
3,417,321  12/1968  Clapp.

LEE T. HIX, Primary Examiner

G. GOLDBERG, Assistant Examiner

U.S. Cl. X.R.

307—241, 282, 297; 321—2, 18; 323—25